United States Patent Office 3,243,410

Patented Mar. 29, 1966

3,243,410

ORGANOSILICON POLYMERIZING CATALYST

Donald E. McVannel, Merrill, Mich., assignor to Dow Corning Corporation, Midland, Mich., a corporation of Michigan No Drawing. Filed Mar. 29, 1963, Ser. No. 269,151
12 Claims. (Cl. 260—46.5)

This invention relates to a new class of catalysts for polymerizing organosilicon compounds.

There are two basic commercial methods for polymerizing organosiloxanes. One of these is by rearranging siloxane linkages. This method involves the use of a bond rearranging catalyst such as a strong alkali or a strong acid. This method is widely used commercially, but it suffers from the disadvantage that the siloxane bonds of the produced polymer can be rearranged by the same catalyst to produce the starting cyclic materials. Consequently, this method inherently gives a certain portion of cyclic products in the final polymer.

The cyclic trimers of diorganosiloxanes have been found to be unique in that, under the influence of the above alkaline catalysts linear products are formed which degrade to cyclic materials (by further rearrangement) at a sufficiently slower rate that linear polymers can be isolated by deactivating or, preferably, removing the catalyst at the proper time. This principle of employing the trimer and deactivating the catalyst at the stated suitable time is utilized in the preparation of fluorohydrocarbon polysiloxanes, as shown in U.S. Patent 3,002,951.

The second method of polymerizing siloxanes is through the condensation of silicon-bonded hydroxyl groups. By this method, if the starting siloxane contains more than six silicon atoms, essentially no cyclic products are formed during the polymerization. (Catalysts commonly classed as rearranging catalysts also cause hydroxyl condensation, but because they also cause bond rearrangement are not normally classed with the condensation catalysts.) An example of a catalyst for condensation of silicon-bonded hydroxyl groups is given in U.S. Patent 2,902,468. The said catalyst has no effect on the siloxane bonds in the system other than to catalyze their formation. It is this latter method of polymerization to which this invention is directed.

It has also been found that certain cyclic siloxanes are caused to polymerize by the catalysts of this invention. This action is distinguished, however, by the fact that the cyclics are converted to linear polymers in an irreversible reaction, and that further no new cyclic materials are formed by the presently disclosed catalysts. These certain cyclics are the diorganosiloxane cyclic trimer and the tetraorganosilethylenesiloxane cyclic dimer.

It is an object of this invention to provide a new method of polymerizing siloxanes containing silicon-bonded hydroxyl radicals. It is another object to provide a new method of converting cyclotrisiloxanes to linear polysiloxanes. A further object is to provide a method of converting silethylenesiloxane dimer cyclics to linear silethylenesiloxane polymers. Another object is to provide a method for polymerizing siloxanes without the accompanying rearrangement of the siloxane bond to give volatile fragments. Another object is to provide a novel method of curing siloxanes. These and other objects will become apparent from the following description.

This invention relates to a method of polymerizing organosilicon compounds which comprises contacting (1) an organosilicon compound selected from the group consisting of (a) organosilicon compounds having an average per silicon atom of 1 to 3 inclusive substituent groups selected from the group consisting of monovalent hydrocarbon radicals, monovalent halohydrocarbon radicals and cyanoalkyl radicals, and at least one SiOH group per molecule, any remaining valences of the silicon atoms of said organosilicon compound being satisfied by selection from the group consisting of divalent oxygen atoms, divalent hydrocarbon radicals, divalent hydrocarbon ether radicals containing no more than one oxygen atom therein, and haloarylene radicals, (b) diorganosiloxane cyclic trimers wherein the organic radicals are selected from the group consisting of monovalent hydrocarbon radicals, monovalent halohydrocarbon radicals and cyanoalkyl radicals, (c) diorgano-silethylenesiloxane cyclic dimers wherein the organic radicals are selected from the group consisting of monovalent hydrocarbon and halohydrocarbon radicals, each free of aliphatic unsaturation, and cyanoalkyl radicals, and (d) mixtures thereof with (2) a compound of the formula $R(SM)_x$ wherein R is selected from the group consisting of unsubstituted and substituted hydrocarbon radicals of valence $x$, M is selected from the group consisting of alkali metals, tetraorganonitrogen radicals and tetraorganophosphorus radicals, the organic radicals of the said nitrogen and phosphorus radicals being monovalent hydrocarbon radicals free of aliphatic unsaturation attached directly to the said nitrogen and phosphorus atoms, and $x$ has a value of at least one, until the desired degree of polymerization is obtained.

Component (1) can be any of the three defined compositions (a), (b) and (c), or any mixtures thereof. Composition (a) can be made up of units of the formulae $R'SiO_{1.5}$, $R'_2SiO$, $R'_3SiO_{0.5}$, various silcarbane structures such as silmethylene, silethylene, silphenylene, etc., and limited amounts of $SiO_2$ groups, wherein R' is a monovalent organic radical as defined.

Component (a) can be a monomer or polymer; that is, it can contain only one silicon atom per molecule or more than one silicon atom per molecule. There can be from one to any number of silanol groups per molecule, provided the composition falls within the definition given above. Thus, for the purpose of this invention, organosilicon compound (a) can be polymeric materials such as 1,1,3,3 - tetramethyl - 1,3 - disilapropane-1,3-diol, 1,3-dimethyl - 1,3-diphenyl-1,3-disiloxane-1,3-diol, hydroxylated diethylsiloxanes, and hydroxylated phenylmethylsiloxanes. In addition, organosilicon compound (a) can be copolymers of any of the defined organosilicon compounds such as copolymers of chlorophenylmethylsiloxane and dimethylsiloxane; copolymers of monophenylsiloxane, phenylmethylsiloxane and trimethylsiloxane and copolymers of dimethylsilphenylene and phenylmethylsiloxane. As well, organosilicon compound (a) can be a mixture of two or more of the defined monomers, polymers and copolymers.

For the purpose of this invention the monovalent hydrocarbon radicals attached to the silicon atoms of (a) can be any monovalent hydrocarbon radical such as alkyl radicals such as methyl, ethyl, isopropyl, tertiarybutyl, octadecyl or myricyl; alkenyl radicals such as vinyl, allyl, methallyl, hexenyl or butadienyl; cycloaliphatic radicals such as cyclopentyl, cyclobutyl and cyclohexenyl; aralkyl radicals such as benzyl and beta-phenylethyl; and aromatic hydrocarbon radicals such as phenyl, xenyl, tolyl, naphthyl and anthracyl. The organosilicon compound (a) can also contain any perfluoroalkylethyl radical such as 3,3,3-trifluoropropyl and $C_9F_{19}CH_2CH_2$—, haloaryl radicals such as tetrachlorophenyl, pentabromoxenyl, and iodonaphthyl; and cyanoalkyl radicals such as $$-CH_2CH_2CN,$$

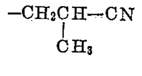

and the like.

The divalent hydrocarbon radicals of organosilicon compound (a) can be any divalent hydrocarbon radical such as alkylene such as methylene, ethylene, hexylene and octadecylene; alkenylene radicals such as propenylene, butenylene and hexenylene; aryl radicals such as phenylene, xenylene, tolylene and naphthylene; and any divalent haloarylene radicals such as tetrachlorophenylene, dibromonaphthylene, iodotolylene and bis-(trifluoromethyl)xenylene.

Any diorganocyclotrisiloxane or cyclic silethylenesiloxane as described above can be polymerized by the method of this invention. Thus, for the purpose of this invention, each radical of cyclotrisiloxane (1)(b) above can independently be as defined. The radical can be alkyl such as methyl, ethyl, butyl, octadecyl and myricyl, both straight and branched chain; unsaturated aliphatic such as vinyl, allyl, methallyl, propargyl and butadienyl; cycloaliphatic such as cyclobutyl, cyclopentyl and cyclohexadienyl; aralkyl such as benzyl, 2-phenylpropyl and phenethyl; aryl such as phenyl, xenyl, naphthyl, benzylphenyl and anthracyl; and alkaryl such as tolyl, xylyl and t-butylphenyl. The radical can also be halogenated derivatives of any of the above said radicals, such as chloromethyl, bromobutenyl, dibromocyclopentyl, α,α-difluorobenzyl, perchlorophenyl and hexafluoroxylyl. The radical can also be any cyanoalkyl radical such as 2-cyanoethyl, 2-cyanopropyl, 4-cyanoisohexyl, and cyanooctadecyl. Generally, preferred radicals are those commercially available, including methyl, ethyl, vinyl, allyl, 2-phenylpropyl, phenyl, xenyl, 3,3,4,4,4-pentafluorobutyl, 3,3,3-trifluoropropyl, β-cyanoethyl and gamma-cyanopropyl.

Cyclotrisiloxane (1)(b) can contain one, two or three different kinds of diorganosiloxane units therein. Generally, all three units are the same; these trimers are most easily prepared by the method described in U.S. Patent 2,979,519, which briefly comprises contacting a siloxane of the unit formula $R'_2SiO$, with or without other siloxanes such as $R'_3SiO_{0.5}$ and $R'SiO_{1.5}$, (R' is a monovalent organic radical) with an alkaline catalyst and heating to distil the corresponding cyclotrisiloxane from the reaction mixture. However, there can be two or even three kinds of diorganosiloxane units in cyclotrisiloxane (1)(b), which can be obtained by, for example, cohydrolysis or by any of several other well known procedures common to silicone chemistry. The exact method by which the cyclotrisiloxane is made is unimportant to the process of the invention.

Thus, cyclotrisiloxane (1)(b) can be a homotrimer, a cotrimer or a mixture of homo- and/or cotrimers. This is advantageous in that copolymers can be prepared by this method employing either a cocyclic trimer, i.e. one containing two or more kinds of siloxane units per trimer, or mixtures of two or more trimers, each containing a different siloxane therein. It is, of course, obvious that each of the two R radicals on a silicon atom can be the same or different.

Silethylenesiloxane cyclic (1)(c) can be any silethylenesiloxane cyclic as above defined. Thus, each radical can be, for example, alkyl such as methyl, ethyl, propyl, butyl, hexyl, octyl, dodecyl, octadecyl and myricyl; cycloalkyl such as cyclobutyl, cyclopentyl and cyclohexyl; aralkyl such as benzyl, phenethyl, 2-xenylpropyl and 4-naphthyl-7-tolyldodecyl; aryl such as phenyl, xenyl, naphthyl, anthracyl, phenanthryl, fluorenyl, naphthacenyl, pyrenyl, idenyl and acenaphthenyl; arkaryl such as tolyl, xylyl, ethylphenyl, t-butylxenyl, octadecylnaphthyl, cumenyl and durenyl; halogenated derivatives of the above such as chloromethyl, 3-chloropropyl, dibromooctadecyl, iodocyclopentyl, 3,3,3-trifluoropropyl, pentadecylfluorononyl, 2,2-bis(trifluoromethyl)ethyl, chlorophenyl, α,α-difluorobenzyl and bis-(trifluoromethyl)phenyl; and cyanoalkyl such as β-cyanoethyl, gamma-cyanopropyl, delta-cyanohexyl and omega-cyanooctadecyl. Generally, preferred radicals are those readily available commercially, including methyl, ethyl, cyclohexyl, phenyl and 3,3,3-trifluoropropyl. It is preferred when the product will be used in a high temperature environment that at least one of the radicals, and most preferably two or more, be phenyl.

The preparation of these silethylenesiloxane cyclics is detailed in U.S. Patent 3,041,362 (Merker), and in copending application Serial No. 251,065, filed January 14, 1963 (Steward) now abandoned, both references of which are hereby incorporated by reference. In the method of Steward, cyclics wherein all radicals are the same are most easily prepared, while in the Merker method each organic radical can be the same or different. Thus, each radical in this compound can be the same or different, as desired. Additionally, mixtures of two or more silethylenesiloxane cyclics can be employed.

Component (1) can be any of (a), (b) or (c) above. Further, it can comprise more than one (a) compound, or (b) component, or (c) component. In addition, component (1) can be a mixture of one or more each of (a) and (b), one or more each of (a) and (c), one or more each of (b) and (c), or one or more of each of (a), (b) and (c) components.

Component (2) of this invention is the novel catalyst. It is an alkali salt of a thio-compound, of the formula $R(SM)_x$ wherein R is an organic radical of valence $x$, M is an alkali metal or tetraorganoammonium or tetraorganophosphorium radical, and $x$ is at least one.

Radical R can be monovalent hydrocarbon such as aliphatic such as methyl, ethyl, propyl, butyl, octadecyl, myricyl, vinyl, allyl, methallyl, butadientyl, butenynyl and propargyl; cycloaliphatic such as cyclobutyl, cyclopentenyl and cyclohexadienyl; and aromatic such as phenyl, xenyl, naphthyl, anthracyl, pyrenyl, phenanthryl, fluorenyl, naphthacenyl, idenyl, tolyl, xylyl, t-butylxenyl, octadecylnaphthyl, cumenyl, durabuyl, benzyl, phenethyl and 4-naphthyl-7-tolyldodecyl. Radical R can also be substituted monovalent hydrocarbon, such as halogenated, hydroxylated, aminated, nitrated, silylated, etc. Examples of substituted monovalent hydrocarbon radicals include $CF_3CH_2—$, $C_6Cl_2H_{11}—$, $HOCH_2CH_2—$, 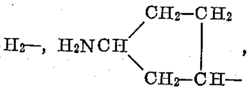 , 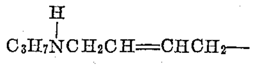

$NO_2C_6H_4—$, 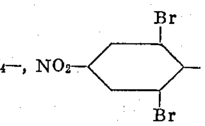 and $(CH_3)_2C_6H_5SiCH_2CH_2CH_2—$

Radical R can also be di- and poly-valent hydrocarbon and substituted hydrocarbon, such as $—CH_2CH_2—$, $—CH_2CH=CHCH_2—$, 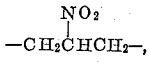, 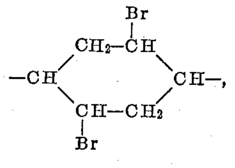,

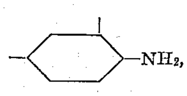, 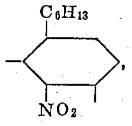, 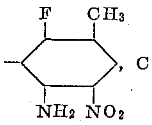, $C(CH_2—)_4$,

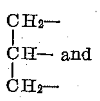 and $CH_3CH_2CH(CH_2—)_3$

Substituent M can be an alkali metal; it can also be a tetraorganonitrogen or tetraorganophosphorus radical wherein the said organic radicals are monovalent hydrocarbon such as methyl, ethyl, octadecyl, cyclohexyl, benzyl, phenyl and tolyl. Preferably M is sodium, lithium or potassium.

Because of the more ready availability and stability of organosulfur compounds as above containing only one sulfur therein, it is preferred that $x$ is 1. This is not to say the $x$ cannot be more than one, if desired; however, when $x$ is greater than one the stability of compound (2) is reduced. Thus, preferred compounds are of the formula RSM. Most preferred are those wherein R is monovalent unsubstituted or monosubstituted, containing less than about seven carbon atoms. Examples of most preferred compounds (2) are $CH_3CH_2CH_2CH_2SK$, $HOCH_2CH_2SN_a$, $C_6H_5SLi$, $CH_3CH(NO_2)CH_2SNa$ and $CF_3CH_2SK$ Component (2) is prepared by reacting stoichiometric quantities of $R(SH)_x$ and MOH. When the thiol is a volatile compound, this property can be put to good use to insure complete reaction of the alkali hydroxide by employing an excess of the thiol over the above said stoichiometric amount. The reaction is best carried out in a mutual solvent for the two reactants. Water, alcohol, and water-alcohol mixtures are especially suitable solvents for the reaction, although any fluid that is a solvent for the two can be employed if desired. The said solvent serves to bring the two reactants into intimate contact and to therefore hasten the reaction. The catalyst can be recovered by evaporation of the solvent. Alternatively, it can be left in the solution in which it is prepared, if desired.

The polymerization is carried out by contacting component (1) with compound (2). Reaction proceeds at room temperature, and in many cases at a sufficient rate that heating to hasten the reaction may even be inadvisable. However, when the reaction is sluggish at room temperature, the rate can be enhanced by heating. When organosilicon compound (1)(a) is present, the rate can be further increased by providing a means for removing by-produced water. This can be done by sparging, drawing a vacuum, purging the atmosphere, and, when a water-immiscible solvent is employed, by azeotroping, or by other suitable means.

The polymerization can be carried out in the bulk, if desired. When so desired, it is preferred that the catalyst be one which is at least partly, and more preferably completely soluble in the siloxanes. Alternatively, the polymerization can be conducted in an organic liquid that is a solvent for the reactants, and preferably, the polymerization product. Conventionally, solvents that can be employed include hydrocarbons such as heptane, cyclohexane, methylcyclopentane, benzene, toluene, naphtha, mineral spirits and petroleum ethers; ketones such as acetone, methylisobutyl ketone, acetophenone and benzophenone; ethers such as diethylether, dibutylether, methylamyl ether, ethylene glycol dimethyl ether and diethylene glycol diethylether; esters such as butyl acetate; halogenated organic liquids such as chloroform, perchloroethylene, bromobenzene, benzotrifluoride, 2,2'-dibromodiethylether, trichlorotrifluoroacetone and propyl trichloroacetate; nitriles such as acetonitrile and benzonitrile; nitro compounds such as nitropropane and p-nitrotoluene; and compounds such as diorganosulfones and diorganosulfoxides, such as dimethylsulfone and ethylpropyl sulfoxide.

When component (1)(a) is present, a solvent that is immiscible with and, preferably, azeotropes water provides in addition a handy means of removing by-produced water, when desired.

Components (1)(b) and (1)(c) produce, upon polymerization linear polymers. The presently disclosed catalyst acts on these cyclics to convert them to linear materials. The catalyst is inert to the product, so that for these reactions, the polymerization rate can be followed by determining the rate of disappearance of the cyclics. The polymerization reaction can be stopped at any time short of completeness by deactivating or removing the catalyst. The degree of conversion will be something less than 100 percent, and can be determined by finding the percentage of unconverted cyclic material remaining.

Component (1)(a) can be an essentially difunctional polysiloxane, in which case its polymerization product will also be a linear or essentially linear polymer. However, this component can be other than essentially difunctional, so that products ranging from triorganosilyl endstopped fluids to complex resinous networks can result from the polymerizations wherein there is contained some of component (1)(a) by this system. In fact, the polymerization catalyst of this invention is also a curing catalyst for systems where the functionality of the system is greater than two per silicon atom, in that rigorous polymerization will produce a crosslinked, or cured, network.

When it is desired to introduce functionality other than two into a system polymerized from components (1)(b) and/or (1)(c), this can conveniently be done by the inclusion of the desired amount of component (1)(a) that will give the said different functionality.

One of the important uses for the instant method is to prepare essentially linear polymers of gum grade (i.e. viscosity above 5,000,000 cs.) for use in organosilicon elastomers. For this purpose the components (1)(b) and (1)(c) are ideally suited, as these are precisely difunctional. There are also many sources of strictly difunctional siloxanes of the component (1)(a) type that are also admirably suited to this use, as well. However, component (1)(a) can best be used in this circumstance to supply the very desirable slight amount of endstopping for these desired gum polymers. When gums are desired it is advisable to rigorously remove moisture, either before or during the polymerization. This is, of course, true for all methods of polymerization, and the same stratagems can be employed here, such as pre-drying the components, sparging or sweeping with a dry atmosphere, and, in this method, employing such other procedures as stated above.

From the above discussion it is readily apparent that in the method of this invention component (1) can be a single kind, or mixture of one kind or mixture of one or more each of two or three kinds, and further that mixtures of component (1) allow an increased versatility of the polymerization process.

The process of this invention is also suitable for the preparation of fluid polysiloxanes having low amounts or no volatile fragments. It is also suitable for the polymerization to and curing of resinous silicones that may be applied as coatings for electrical conductors or as protective coatings for wood and metal surfaces.

The following examples are illustrative only and are not to be construed as limiting the invention, which is properly delineated in the appended claims.

*Example 1*

This example illustrates the ease of preparing the catalyst of this invention.

A mixture of 39 g. (0.50 mol) of monothioglycol ($HSCH_2CH_2OH$), 20 g. (0.357 mol) of potassium hydroxide and 100 g. of methanol was placed in a reactor and agitated until there was complete solution of the thiol and alkali in the methanol. The methanol, by-produced water and excess $HSCH_2CH_2OH$ were removed by heating to 100° C. at a pressure of 1 mm. of mercury for one hour. The product ($KSCH_2CH_2OH$) was a white solid. This was crushed to a powder for use as a catalyst.

*Example 2*

A mixture of 100 g. of a hydroxyl endblocked essentially dimethylpolysiloxane having a viscosity of 70 cs. at 25° C. and 0.1 g. of the catalyst prepared in Example 1 was heated two hours at 110° C. with stirring at a continuously maintained pressure of 1.0 mm. of mercury. A high gum polymer resulted.

An identical mixture was heated three hours at 180 to 200° C. at 1 mm. of mercury. This polymer was extremely high in molecular weight and very dry, but was completely soluble in toluene.

*Example 3*

A mixture of 100 g. of a hydroxyl-endblocked 3,3,3-trifluoropropylmethylpolysiloxane, containing 2.1 weight percent of silicon-bonded hydroxyl radicals, and 0.1 g. of the catalyst of Example 2 was heated with mixing for three hours at 180 to 200° C. and 1.0 mm. pressure. The resulting high polymer had a Williams plasticity of 0.035".

*Example 4*

A mixture of 20 g. of the cyclic trimer of 3,3,3-trifluoropropylmethylsiloxane and 0.02 g. of the catalyst of the preceding example was heated three days at 150° C. in a closed container. The siloxane polymerized to a thick fluid in less than four hours and underwent no further change subsequent to this time.

*Example 5*

A mixture of 20 g. of the cyclic trimer of Example 4, 0.02 g. of the catalyst of that example and 0.02 g. of calcined calcium oxide was heated three days at 150° C. in a closed container. Polymerization proceeded rapidly to form a high gum in three hours, which did not change after this time.

The preceding two examples illustrate the irreversibility of the polymerization reaction of this invention. When the cyclic trimer of this invention is polymerized with conventional alkaline catalysts a high polymer which results is rather quickly reverted to cyclic materials other than the trimer unless the catalyst is deactivated or removed. The polymers produced in Examples 4 and 5 above were unaffected by the catalyst of this invention, as shown by there being no change after polymerization (3 to 4 hours) even on continued heating for a total of three days.

*Example 6*

Salts are formed as shown when any of the following thiols are reacted with the alkaline reagents as shown, following the procedure of Example 1.

| Thiol | Alkaline Reagent | Salt |
|---|---|---|
| $C_{18}H_{37}SH$ | CsOH | $C_{18}H_{37}SCs$ |
| $(CH_2CH_2SH)_2$ | LiOH | $(CH_2CH_2SLi)_2$ |
| $CH_3CH_2C(CH_2SH)_3$ | $(CH_3)_4NOH$ | $CH_3CH_2C[CH_2SN(CH_3)_4]_3$ |
| $CF_3CH_2SH$ | $C_{12}H_{25}(CH_3)_3NOH$ | $CF_3CH_2SN(CH_3)_3C_{12}H_{25}$ |
| $CH_3CH{=}CHCH_2SH$ | NaOH | $CH_3CH{=}CHCH_2SNa$ |
| $C_6H_5CH_2SH$ | RbOH | $C_6H_5CH_2SRb$ |
| 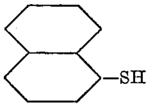 | $C_6H_5(C_2H_5)_2POH$ | 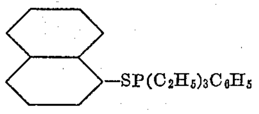 |
| 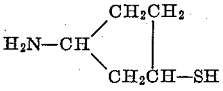 | NaOH | 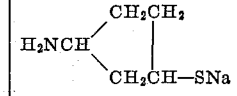 |
| 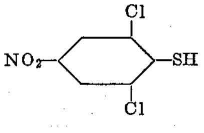 | KOH | 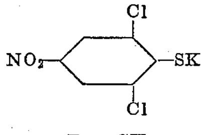 |
| 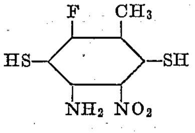 | KOH | 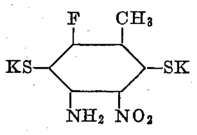 |

*Example 7*

Equivalent results are obtained when any of the following reagents are used in place of methanol in Example 1: water, ethanol, isopropanol, acetonitrile, ethylene glycol, dimethylether, dioxane, tetrahydrofuran, and mixtures of any of the above.

*Example 8*

Polymerization occurs when any of the following mixtures are reacted as shown:

(a) A mixture of 100 parts of a cyclic of the formula

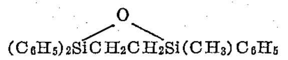

and 20 parts of $C_{18}H_{37}SCs$, heated 20 minutes at 45° C.

(b) A mixture of 90 parts of a cyclic of the formula

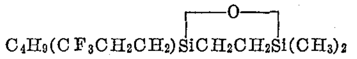

5 parts of the cyclic trimer of $(CH_3)_2SiO$, 4 parts of a hydroxyl endblocked 300 cs. (at 25° C.) fluid containing 10 mol percent of $ClC_6H_3(CH_3)SiO$ units and 90 mol percent of $C_2H_5(CH_3)SiO$ units, 1 part of a cyclic trimer containing two $CH_3(CH_2{=}CH)SiO$ units and one $$CH_3(C_{18}H_{37})SiO$$

units and 3 parts of $LiSCH_2CH_2CH_2CH_2SLi$, heated 38 hours at 78° C. under a dry air.

(c) A dispersion of 75 parts of

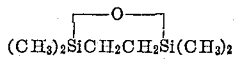

20 parts of

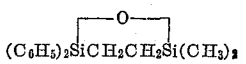

5 parts of the cyclic trimer of phenylmethylsiloxane and 15 parts of $CH_3CH_2C[CH_2SN(CH_3)_4]_3$ in 400 parts of methylcyclopentane, heated 15 minutes at reflux with azeotrope.

(d) A dispersion of 90 parts of a hydroxylated 100 cs. (at 25° C.) polysiloxane containing 98 mol percent of dimethylsiloxane units and two mol percent of monophenylsiloxane units, 10 parts of the cyclic

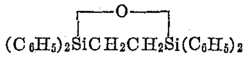

and 0.02 part of $CH_3CH{=}CHCH_2SNa$ in 900 parts of toluene, heated at the reflux for two hours.

(e) A mixture of 3 parts the cyclic trimer of chlorophenylmethylsiloxane, 95 parts of the cyclic trimer of $C_7F_{15}CH_2CH_2(CH_3)SiO$ and 0.5 part of $$CF_3CH_2SN(CH_3)_3C_{12}H_{25}$$

heated 10 minutes at 135° C., sparging with dry nitrogen.

(f) A dispersion of 3 parts of

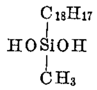

0.2 part of a hydroxyl-endblocked 40 cs. (at 25° C.) methylvinylpolysiloxane, 4 parts of a hydroxyl endblocked cyclohexylmethylpolysiloxane, 1.8 parts of diphenylsilanediol, 6 parts of hydroxylated monophenylpolysiloxane, 2 parts of a hydroxyl-endblocked benzylethylpolysiloxane, 83 parts of the cyclic trimer of dimethylsiloxane and 0.05 part of $C_6H_5CH_2SRb$ in 1100 parts of cyclohexane, heated 4 hours at reflux with azeotrope.

*Example 9*

When a hydroxylated resin containing $MeSiO_{3/2}$ units is heated with at least 0.01 part per hundred of resin of

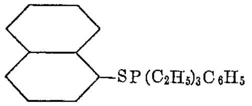

the resin becomes further crosslinked.

When 1 part of

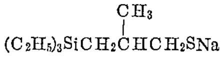

is substituted for the phosphorium salt above, crosslinking also results.

*Example 10*

When 100 parts of diphenylmethylsilanol and 0.5 part of

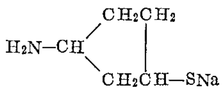

are mixed and heated at high vacuum above 100° C., the corresponding disiloxane, tetraphenyldimethyldisiloxane is formed in excellent yield.

When 2 parts of $NaSCH_2CH_2SLi$ are substituted for the thiol salt above, equivalent results are obtained.

That which is claimed is:

1. A method of polymerizing organosilicon compounds which comprises contacting
   (1) an organosilicon compound selected from the group consisting of
      (a) organosilicon compounds having an average per silicon atom of 1 to 3 inclusive substituent groups selected from the group consisting of monovalent hydrocarbon radicals, monovalent halohydrocarbon radicals and cyanoalkyl radicals, and at least one SiOH group per molecule, any remaining valences of the silicon atoms of said organosilicon compound being satisfied by selection from the group consisting of divalent oxygen atoms, divalent hydrocarbon radicals, divalent hydrocarbon ether radicals containing no more than one oxygen atom therein, and haloarylene radicals,
      (b) diorganosiloxane cyclic trimers wherein the organic radicals are selected from the group consisting of monovalent hydrocarbon radicals, monovalent halohydrocarbon radicals and cyanoalkyl radicals,
      (c) diorgano - silethylenesiloxane cyclic dimers wherein the organic radicals are selected from the group consisting of monovalent hydrocarbon and halohydrocarbon radicals, each free of aliphatic unsaturation, and cyanoalkyl radicals, and
      (d) mixtures thereof with
   (2) a compound of the formula $R(SM)_x$ wherein
      R is selected from the group consisting of unsubstituted and substituted hydrocarbon radicals of valence *x*, M is selected from the group consisting of alkali metals, tetraorganonitrogen radicals and tetraorganophosphorus radicals, the organic radicals of the said nitrogen and phosphorus radicals being monovalent hydrocarbon radicals free of aliphatic unsaturation attached directly to the said nitrogen and phosphorus atoms, and
      *x* has a value of from 1 to 4 inclusive, until the desired degree of polymerization is obtained.

2. The method of claim 1 wherein *x* is 1.

3. The method of claim 2 wherein component (2) is alkali salt of an aliphatic thiol.

4. The method of claim 3 wherein component (1) is (a).

5. The method of claim 4, wherein component (1) (a) has an average per silicon atom of essentially two said defined substituents groups.

6. The method of claim 3 wherein component (1) is (b).

7. The method of claim 3 wherein component (1) is (c).

8. The method of claim 3 wherein component (1) is a mixture of (a) and (b).

9. The method of claim 3 wherein component (1) is a mixture of (a) and (c).

10. The method of claim 3 wherein component (1) is a mixture of (b) and (c).

11. The method of claim 3 wherein component (1) is a mixture of (a), (b) and (c).

12. A method of polymerizing organosilicon compounds which comprises contacting
   (1) an organosilicon compound selected from the group consisting of
      (a) a hydroxyl-endblocked essentially diorganopolysiloxane wherein the organic groups are selected from the group consisting of monovalent hydrocarbon radicals, monovalent halohydrocarbon radicals and cyanoalkyl radicals, in which siloxane up to 50 percent of the siloxane oxygen atoms can be replaced by organic radicals selected from the groups consisting of divalent hydrocarbon radicals, divalent hydrocarbon ether radicals containing no more than one oxygen atom therein, and haloalkylene radicals,
      (b) diorganosiloxane cyclic trimers wherein the organic radicals are selected from the group consisting of monovalent hydrocarbon radicals, monovalent halohydrocarbon radicals and cyanoalkyl radicals,
      (c) diorgano - silethylenesiloxane cyclic dimers, wherein the organic radicals are selected from the group consisting of monovalent hydrocarbon and halohydrocarbon radicals each free of aliphatic unsaturation, and cyanoalkyl radicals, and
      (d) mixtures thereof, with
   (2) a compound of the formula RSM wherein R is selected from the group consisting of unsubstituted and substituted hydrocarbon radicals and M is an alkali metal atom, under conditions whereby moisture is substantially excluded until an essentially linear high polymer is obtained.

References Cited by the Examiner

UNITED STATES PATENTS

| | | | |
|---|---|---|---|
| 2,842,520 | 7/1958 | Polmanteer et al. | 260—46.5 |
| 2,983,745 | 5/1961 | Speier | 260—46.5 |
| 3,002,951 | 10/1961 | Johannson | 260—46.5 |
| 3,041,362 | 6/1962 | Merker | 260—46.5 |
| 3,041,363 | 6/1962 | Merker et al. | 260—46.5 |

LEON J. BERCOVITZ, *Primary Examiner.*

WILLIAM H. SHORT, MELVYN I. MARQUIS, *Assistant Examiners.*